(12) United States Patent
Ghabra

(10) Patent No.: US 9,685,014 B1
(45) Date of Patent: Jun. 20, 2017

(54) REMOTE CONTROL SYSTEM USING DIFFERENT TYPES OF CARRIER WAVES FOR POLLING SIGNALS

(71) Applicant: Lear Corporation, Southfield, MI (US)

(72) Inventor: Riad Ghabra, Northville, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 15/040,484

(22) Filed: Feb. 10, 2016

(51) Int. Cl.
*H04W 4/00* (2009.01)
*G07C 9/00* (2006.01)
*H04B 1/16* (2006.01)

(52) U.S. Cl.
CPC ...... *G07C 9/00111* (2013.01); *G07C 9/00182* (2013.01); *H04W 4/008* (2013.01); *G07C 2009/00301* (2013.01); *H04B 1/1615* (2013.01)

(58) Field of Classification Search
CPC ............ G07C 2209/63; G07C 9/00111; G07C 9/00182; G07C 2009/00373; G07C 2009/00388; G07C 2209/00301; G07C 2009/00555; G07C 2209/62; G07C 2009/00357; G07C 2009/00365; G07C 2009/00396; G07C 2009/00198; G07C 2009/00333
See application file for complete search history.

(56) References Cited

U.S. PATENT DOCUMENTS

| | | | |
|---|---|---|---|
| 5,973,611 A | 10/1999 | Kulha et al. | |
| 8,531,268 B2 | 9/2013 | Ghabra et al. | |
| 8,725,315 B2 | 5/2014 | Talty et al. | |
| 2006/0114100 A1* | 6/2006 | Ghabra | E05B 81/78 340/5.61 |
| 2006/0279467 A1* | 12/2006 | LeMense | H01Q 1/3241 343/711 |
| 2011/0084816 A1 | 4/2011 | Briese et al. | |
| 2012/0158214 A1* | 6/2012 | Talty | B60R 25/24 701/2 |
| 2013/0035042 A1* | 2/2013 | Matsumoto | H04W 88/04 455/66.1 |
| 2014/0232322 A1 | 8/2014 | Kracker et al. | |

(Continued)

FOREIGN PATENT DOCUMENTS

JP 2007216869 A 8/2007

OTHER PUBLICATIONS

Intellectual Property Office, Combined Search and Examination Report for the Great Britain Patent Application No. GB1615436.1 dated Mar. 9, 2017.

*Primary Examiner* — Alejandro Rivero
(74) *Attorney, Agent, or Firm* — Brooks Kushman P.C.

(57) ABSTRACT

A carrier wave is selected based on a state of a target device such as a vehicle. A polling signal is generated using the selected carrier wave for transmission from the target device for receipt by a portable controller. A sinusoidal carrier wave is selected when the target device is in a state that is more sensitive to electrical noise interference caused by the polling signal being generated using the carrier wave than to electrical energy consumed in generating the polling signal using the carrier wave. A non-sinusoidal periodic carrier wave is selected when the target device is in a state that is more sensitive to electrical energy consumed in generating the polling signal using the carrier wave than to electrical noise interference caused by the polling signal being generated using the carrier wave.

5 Claims, 2 Drawing Sheets

(56) References Cited

U.S. PATENT DOCUMENTS

| | | |
|---|---|---|
| 2014/0285319 A1 | 9/2014 | Khan et al. |
| 2014/0320260 A1 | 10/2014 | Van Wiemeersch et al. |
| 2015/0079914 A1* | 3/2015 | Takahashi ............ H01Q 1/3241 455/127.2 |
| 2015/0247481 A1* | 9/2015 | Tomita ................ F02N 11/0807 701/2 |
| 2016/0042579 A1* | 2/2016 | Austen ............... G07C 9/00309 340/5.61 |

* cited by examiner

REMOTE CONTROL SYSTEM USING DIFFERENT TYPES OF CARRIER WAVES FOR POLLING SIGNALS

TECHNICAL FIELD

The present disclosure relates to remote control systems including passive entry passive start (PEPS) systems.

BACKGROUND

Passive entry passive start (PEPS) systems include a base station and a portable remote controller. The base station is at a target device such as a vehicle. The remote controller is carried by a user. The base station and the remote controller wirelessly communicate with one another for remote control of the target device.

SUMMARY

A method includes selecting a carrier wave based on a state of a target device and generating a polling signal using the selected carrier wave for transmission from the target device for receipt by a portable controller.

The step of selecting may include selecting a sinusoidal carrier wave when the target device is in a state that is more sensitive to electrical noise interference caused by the polling signal being generated using the carrier wave than to electrical energy consumed in generating the polling signal using the carrier wave.

The step of selecting may include selecting a non-sinusoidal periodic carrier wave when the target device is in a state that is more sensitive to electrical energy consumed in generating the polling signal using the carrier wave than to electrical noise interference caused by the polling signal being generated using the carrier wave.

A method includes selecting, at a base station of a vehicle, a type of carrier wave from different types of carrier waves based on a state of the vehicle and transmitting, from the base station, a polling signal generated from a carrier wave of the selected type for receipt by a portable controller.

The different types of carrier waves may include a sinusoidal carrier wave and one or more different types of non-sinusoidal periodic carrier waves. The one or more different types of non-sinusoidal periodic carrier waves may include a square carrier wave and a triangle carrier wave.

The step of selecting may include: selecting a sinusoidal carrier wave when the vehicle state is a key on vehicle state; selecting a sinusoidal carrier wave when the vehicle state is an accessory mode vehicle state; and selecting a non-sinusoidal periodic carrier wave when the vehicle state is a key off vehicle state.

The state of the vehicle may include a first vehicle state and a second vehicle state. In this case, the step of selecting may include: selecting a sinusoidal carrier wave when the state of the vehicle is the first vehicle state; and selecting a non-sinusoidal periodic carrier wave when the state of the vehicle is the second vehicle state.

A system includes a base station at a target device. The base station is configured to detect a state of the target device, select a type of carrier wave from different types of carrier waves based on the state of the target device, generate a polling signal using a carrier wave of the selected type, and transmit the polling signal for receipt by a portable controller.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
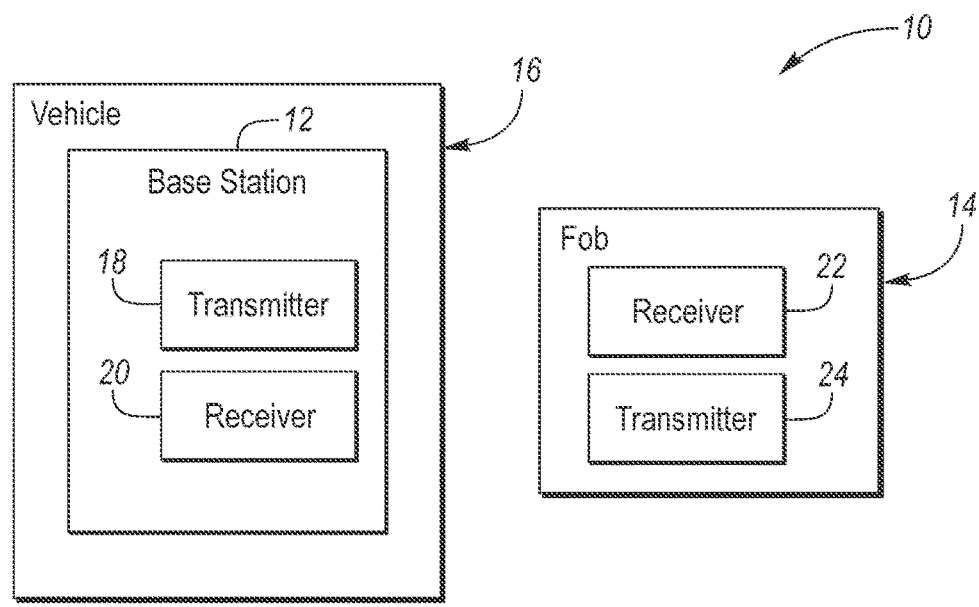
FIG. 1 illustrates a block diagram of a remote control system having a base station at a target device in the form of a vehicle and a portable remote controller in the form of a key fob ("fob")

Referring now to FIG. 1, a block diagram of a remote control system 10 is shown. Remote control system 10 includes a base station 12 and a portable remote controller 14. Base station 12 is at a target device such as a vehicle 16. Alternatively, the target device is a house, a garage, a gate, a building, a door, a lighting system, or the like. Remote controller 14 is a portable device such as a key fob ("fob") 14 to be carried by a user. Alternatively, the remote controller is a smart phone, a tablet, a wearable device such as a smart watch, or the like.

Base station 12 is configured to be able to control functions of vehicle 16 (i.e., the target device). Base station 12 and fob 14 (i.e., the remote controller) are operable for wirelessly transmitting/receiving signals to/from one another to enable the fob to remotely control vehicle 16 via the base station.

Remote control system 10 is configured to perform passive entry passive start (PEPS) functions. PEPS capability enables fob 14 to remotely control vehicle 16 automatically (or "passively") without user actuation of the fob. As an example of a passive entry function, base station 12 unlocks a vehicle door in response to fob 14 being brought into the vicinity of vehicle 16. As an example of a passive start function, base station 12 starts vehicle 16 upon a user in possession of fob 14 pressing a start button on the vehicle dashboard.

Remote control system 10 may be further configured to perform remote keyless entry (RKE) functions. RKE capability enables fob 14 to remotely control vehicle 16 in response to user actuation of buttons or the like of the fob. As an example of a RKE function, base station 12 unlocks a door of vehicle 16 in response to receiving a vehicle door unlock command from fob 14. Fob 14 transmits the vehicle door unlock command to base station 12 in response to corresponding user actuation of the fob.

As shown in FIG. 1, base station 12 includes a transmitter 18 and a receiver 20. Base station transmitter 18 is operable for transmitting signals to fob 14 and base station receiver 20 is operable for receiving signals from the fob. Correspondingly, fob 14 includes a receiver 22 and a transmitter 24. Fob receiver 22 is operable for receiving signals from base station 12 and fob transmitter 24 is operable for transmitting signals to the base station.

The signals transmitted from base station transmitter 18 for receipt by fob 14 include polling signals. Base station transmitter 18 transmits polling signals as part of the processes for certain types of PEPS or other remote control operations. For example, base station transmitter 18 transmits polling signals to poll or interrogate the area around vehicle 16 for any fobs. Upon fob 14 receiving a polling signal from base station transmitter 18, fob 14 wakes up and responds somehow. For instance, fob 14 transmits an authentication signal including a command signal for receipt by base station 12. The base station performs the command function in response to receiving the authentication signal with the command function from fob 14. In this way, the command function is performed passively without user actuation of fob 14.

Figure 2:
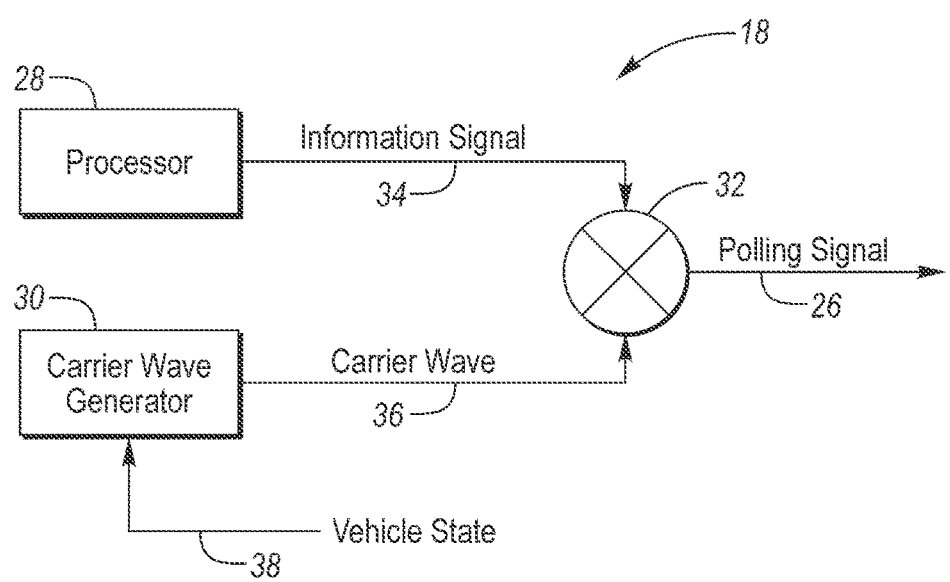
FIG. 2 illustrates a block diagram of a transmitter of the base station including depicting operation of the base station transmitter in generating a polling signal.

Referring now to FIG. 2, with continual reference to FIG. 1, a block diagram of base station transmitter 18 is shown. This block diagram includes a depiction of the operation of base station transmitter 18 in generating a polling signal 26. Base station transmitter 18 includes a processor 28, a carrier wave generator 30 (or "driver"), and a frequency mixer 32. Processor 28 is configured for providing an information signal 34. Information signal 34 is in the form of digital data, which may employ Manchester encoding. The digital data represents the information of information signal 34. The information includes information identifying information signal 34 as forming a polling signal from base station 12. For instance, the information includes a wake up pattern and a message stating that information signal 34 is a polling signal and that a fob in receipt of the polling signal should respond in some way.

Carrier wave generator 30 is configured for generating a carrier wave 36. Carrier wave 36 is to be modulated with information signal 34 to form polling signal 26. The modulation of carrier wave 36 with information signal 34 is for the purpose of wirelessly transmitting the information signal in the form of polling signal 26. As such, carrier wave 36 has an appropriate wireless communication carrier frequency. For instance, the carrier frequency of carrier wave 36 falls within a low-frequency (LF) operating frequency range between 20 to 300 kHz. In this way, polling signal 26 is a LF polling signal. LF polling signals are typically used for polling because such signals only radiate a short distance. The carrier frequency of carrier wave 36 could be any frequency falling within the radio-frequency (RF) band and carrier wave generator 30 is operable for generating the carrier wave with any of such frequencies. As such, polling signal 26 may be a non-LF polling signal.

Carrier wave generator 30 is operable to generate carrier wave 36 in a selected one of various wave forms. For instance, carrier wave generator 30 may generate carrier wave 36 as a sinusoidal carrier wave during a time period and may generate carrier wave 36 as a non-sinusoidal periodic carrier wave during a different time period. The non-sinusoidal periodic carrier wave may be a square carrier wave, a triangle carrier wave, a saw-tooth carrier wave, etc. In general, carrier wave generator 30 is able to generate carrier wave 36 in any user-defined wave form.

Mixer 32 receives information signal 34 from processor 28 and carrier wave 36 from carrier wave generator 30. Mixer 32 modulates carrier wave 36 with information signal 34 to generate polling signal 26. Polling signal 26 is then ready for transmission from base station transmitter 18. Base station transmitter 18 is associated with one or more antennas (not shown) positioned at respective locations of vehicle 16 (e.g., center console, right vehicle door, left vehicle door, trunk). Polling signal 26 is transmitted from the one or more antennas for receipt by fob 14.

Base station transmitter 18 typically generates and transmits a periodic train of polling signals 26 until either fob 14 responds to a polling signal or a time out event expires. Base station transmitter 18 is operable to set the time duration of each polling signal 26 and the amount of polling signals 26 in a given time period based on various factors. For instance, such factors include how fast a user carrying fob 14 could be approaching vehicle 16 and how far from the vehicle it is desirable to detect the user.

As indicated, carrier wave generator 30 can generate carrier wave 36 in any of selected ones of sinusoidal wave forms and non-sinusoidal periodic wave forms. The sinusoidal wave forms include a sine wave. The non-sinusoidal periodic wave forms include a square wave, as well as a triangle wave, a saw-tooth wave, and the like.

A carrier wave 36 having a sinusoidal wave form and a carrier wave 36 having a non-sinusoidal periodic wave form have advantages and disadvantages with one another in regards to electrical power (i.e., current) consumption and electrical noise interference (e.g., electro-magnetic interference (EMI)). A carrier wave 36 having a sinusoidal wave form requires more electrical current consumption for it to be generated than a carrier wave 36 having a non-sinusoidal periodic wave form—less electrical current consumption is an advantage of a carrier wave 36 having a non-sinusoidal periodic wave form compared with a carrier wave 36 having a sinusoidal wave form. A carrier wave 36 having a sinusoidal wave form produces less electrical noise interference than a carrier wave 36 having a non-sinusoidal periodic wave form—less electrical noise interference is an advantage of a carrier wave 36 having a sinusoidal wave form compared with a carrier wave 36 having a non-sinusoidal periodic wave form.

In particular, a carrier wave 36 having a sine wave form requires the most amount of electrical current consumption for its generation, but produces the least amount of electrical noise; a carrier wave 36 having a square wave form requires the least amount of electrical current consumption for its generation, but produces the greatest amount of electrical noise; and a carrier wave 36 having a triangle wave form requires an intermediate amount of electrical current consumption for its generation and produces an intermediate amount of electrical noise.

Accordingly, base station transmitter 18 consumes less electrical current to generate polling signals 26 with a non-sinusoidal periodic carrier wave 36 (e.g., a square carrier wave) than with a sinusoidal carrier wave 36 (e.g., a sine carrier wave). Thus, less electrical energy will be consumed from the electrical energy source (i.e., the vehicle battery) when base station transmitter 18 transmits polling signals 26 with a square carrier wave 36 than with a sine carrier wave 36. However, polling signals 26 with a square carrier wave 36 produce more electrical noise interference than polling signals with a sine carrier wave 36. Thus, a tradeoff exists between electrical power consumption and electrical noise interference when carrier wave generator 30 uses a square carrier wave 36 or a sine carrier wave 36 for polling signals 26.

Base station 12 takes advantage of the tradeoff between electrical power consumption and electrical noise interference when transmitting polling signals 26. Base station 12 takes advantage of the tradeoff by transmitting polling signals 26 with a non-sinusoidal periodic carrier wave 36

(e.g., a square carrier wave 36) during states of vehicle 16 in which the reduced electrical current consumption associated with the square carrier wave is valued more than the electrical noise interference associated with the square carrier wave. For instance, when vehicle 16 is in an "off" state (e.g., the vehicle engine is shut off and the vehicle is parked and is not being operated by a driver), a requested polling operation is likely to be relatively long term and electrical noise interference with vehicle accessories is not a concern as the vehicle is not being used. Thus, when polling is requested while vehicle 16 is in this "off" state, base station transmitter 18 transmits polling signals 26 with square carrier wave 36 to minimize electrical current consumption as it is desired to achieve polling at the lowest achievable electrical current consumption while the vehicle is in the "off" state.

Correspondingly, base station 12 takes advantage of the tradeoff by transmitting polling signals 26 with a sinusoidal carrier wave 36 (e.g., a sine carrier wave 36) during other states of vehicle 16 in which the reduced electrical noise interference associated with the sine carrier wave is valued more than electrical current consumption associated with the sine carrier wave. For instance, when vehicle 16 is in an "on" state (e.g., the vehicle is being operated or driven by a driver), any requested polling operation will be relatively short term and electrical noise interference with vehicle accessories is a concern as the vehicle is being used by a user. Thus, when polling is requested while vehicle 16 is in this "on" state, base station transmitter 18 transmits polling signals 26 with sine carrier wave 36 to minimize electrical noise interference as a user may be using vehicle accessories (e.g., the AM radio).

In operation, carrier wave generator 30 outputs a non-sinusoidal periodic carrier wave 36 (e.g., a square carrier wave 36) or a sinusoidal carrier wave 36 (e.g., a sine carrier wave 36) depending on the state of vehicle 16. The selected type of carrier wave 36 is used to generate polling signals 26. That is, when polling is requested for whatever remote control or PEPS operation, carrier wave generator 30 generates carrier wave 36 for polling signals 26 using a square carrier wave (or a triangle carrier wave, a stair-step carrier wave, or some other non-sinusoidal periodic carrier wave) or a sine carrier wave depending on the state of vehicle 16.

Carrier wave generator 30 includes an input to receive vehicle state information 38. Vehicle state information 38 may be indicative of the following states of vehicle 16: (i) a "key off" vehicle state in which vehicle 16 is parked with the vehicle engine and the vehicle accessory mode being off; (ii) a "key on" vehicle state in which the vehicle engine is on and vehicle accessories (e.g., the vehicle radio) may be on; and (iii) an "accessory mode" vehicle state in which the vehicle engine is off, but vehicle accessories (e.g., the vehicle radio) may be on.

In the key off vehicle state, carrier wave generator 30 generates a square carrier wave 36 for polling signals 26. Carrier wave generator 30 generates square carrier wave 36 for polling signals 26 as (i) the disadvantage of more electrical noise interference associated with the square carrier wave is not a concern whereas (ii) the advantage of less electrical consumption associated with generating the square carrier wave is desired. In the key off vehicle state, electrical noise interference with the (AM) radio of vehicle 16 caused by carrier wave generator 30 in generating square carrier wave 36 is not a concern as the radio is not being used. Thus, any electrical noise interference would not be perceived by a user as the user is not listening to the radio. On the other hand, in the key off vehicle state, minimizing electrical energy used by base station transmitter 18 in transmitting polling signals 26 is desired as the vehicle may be off for a relatively long time (e.g., parked in a parking lot during the day or a driveway during the night/weekend) with the electrical energy being provided by the vehicle battery. That is, the polling process requested by the remote control or PEPS operation likely entails a relatively long polling duration as the vehicle may not be used for some time.

In the key on vehicle state, carrier wave generator 30 generates sine carrier wave 36 for polling signals 26. Carrier wave generator 30 generates sine carrier wave 36 as (i) the disadvantage of more electrical consumption associated with the sine carrier wave is not a concern whereas (ii) the advantage of less electrical noise interference associated with the sine carrier wave is desired. In the key on vehicle state, more electrical energy consumption associated with the sine carrier wave is not a concern as the polling process requested by the remote control or PEPS operation likely entails a relatively short polling duration and/or as the vehicle battery can be replenished as the vehicle is being driven. On the other hand, in the key on vehicle state, minimizing electrical noise interference with the radio of vehicle 16 caused by carrier wave generator 30 in generating sine carrier wave 36 is desired. Minimizing the electrical noise interference is desired as the user will likely listen to the radio at some point while the vehicle is in the key on vehicle state.

In the accessory mode vehicle state, carrier wave generator 30 generates sine carrier wave 36 for polling signals 26. Carrier wave generator 30 generates sine carrier wave 36 as (i) the disadvantage of more electrical consumption associated with the sine carrier wave is not a concern whereas (ii) the advantage of less electrical noise interference associated with the sine carrier wave is desired. In the accessory mode vehicle state, more electrical energy consumption associated with the sine carrier wave is not a concern as the polling process requested by the remote control or PEPS operation likely entails a relatively short polling duration and/or as the user is likely to soon change the accessory mode vehicle state to either the key off vehicle state or the key on vehicle state. On the other hand, in the accessory mode vehicle state, minimizing electrical noise interference with the radio of vehicle 16 caused by carrier wave generator 30 in generating sine carrier wave 36 is desired. Minimizing the electrical noise interference is desired as the user may likely listen to the radio at some point while the vehicle is in the accessory mode vehicle state. In some cases, the user may have specifically enabled the accessory mode just to listen to the radio for a brief period.

Figure 3:
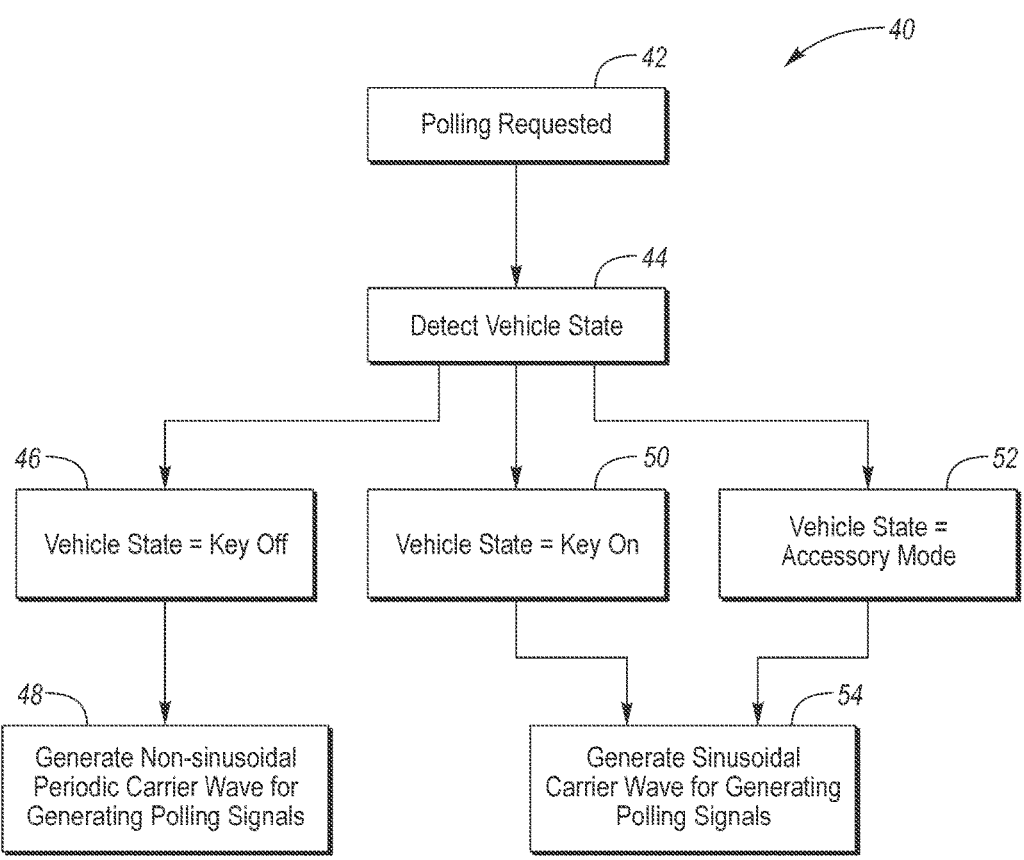
FIG. 3 illustrates a flowchart depicting operation of the base station transmitter using different types of carrier waves for transmitting polling signals.

Referring now to FIG. 3, with continual reference to FIGS. 1 and 2, a flowchart 40 depicting operation of base station transmitter 18 using different types of carrier waves for transmitting polling signals 26 is shown. The operation commences upon base station transmitter 18 receiving a request for transmitting polling signals 26 as indicated in block 42. Carrier wave generator 30 then detects the vehicle state as indicated in block 44. When the vehicle state is key off as indicated in block 46, carrier wave generator 30 generates a non-sinusoidal periodic carrier wave 36 (e.g., a square carrier wave 36) for generating polling signals 26 as indicated in block 48. When the vehicle state is either key on or accessory mode, as indicated in blocks 50 and 52, respectively, carrier wave generator 30 generates a sinusoidal carrier wave 36 (e.g., a sine carrier wave 36) for generating polling signals 26 as indicated in block 54.

As described, the sine wave driver capability of carrier wave generator 30 is used for PEPS systems in order to reduce electrical noise interference from the carrier wave generator to vehicle systems such as the AM radio in vehicle 16. For temporary or on-demand polling operations of a relatively short duration, the sine wave driver capability works well. However, the sine wave driver capability is associated with a relatively higher operating current. Thus, for long term polling operations (i.e., during the key off vehicle state), the sine wave driver capability requires relatively more electrical consumption. In order to achieve the advantages of both of a sine wave driver and a square wave (or quasi square wave) driver, carrier wave generator 30 uses these different types of drivers, but in different situations.

Carrier wave generator 30 has the ability to operate as any of different types of drivers including sine wave, square wave, user-defined waves that could be something between the sine wave and the square wave (i.e., triangle wave, stair-step wave, etc.). Carrier wave generator 30 generates a square carrier wave for long term polling applications and generates a sine carrier wave for short term polling applications. This dual approach works well as a sine carrier wave is used for fob searches when the vehicle radio is on whereas a square carrier wave is only used for fob searches during key off conditions. Another advantage of the square wave driver is the ability to increase the antenna current beyond the sine carrier wave capability of carrier wave generator 30.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
   detecting, by a base station of a vehicle, whether the vehicle is in a key on vehicle state, an accessory mode vehicle state, or a key off vehicle state;
   selecting, at the base station, a LF sinusoidal carrier wave in response to the vehicle being either in the key on vehicle state or the accessory mode vehicle state, the LF sinusoidal carrier wave having a carrier frequency falling within a range of 20 kHz to 300 kHz;
   generating, at the base station, a first LF polling signal including a wakeup message and the LF sinusoidal carrier wave;
   transmitting, from an antenna of the base station, while the vehicle is either in the key on vehicle state or the accessory mode vehicle state the first polling signal for receipt by a portable controller;
   selecting, at the base station, a LF non-sinusoidal periodic carrier wave in response to the vehicle being in the key off vehicle state, the LF non-sinusoidal periodic carrier wave having a carrier frequency falling within a range of 20 kHz to 300 kHz;
   generating, at the base station, a second LF polling signal including a wakeup message and the LF non-sinusoidal periodic carrier wave; and
   periodically transmitting, from the antenna of the base station, while the vehicle is in the key off vehicle state the second polling signal during an absence of a user touching the vehicle until a portable controller responds to the second LF polling signal.

2. The method of claim 1 wherein:
   the non-sinusoidal periodic carrier wave is one of a square carrier wave and a triangle carrier wave.

3. A system comprising:
   a base station at a vehicle;
   the base station is configured to detect whether the vehicle is in a key on vehicle state, an accessory mode vehicle state, or a key off vehicle state;
   the base station is further configured to select a LF sinusoidal carrier wave in response to the vehicle being either in the key on vehicle state or the accessory mode vehicle state, the LF sinusoidal carrier wave having a carrier frequency falling within a range of 20 kHz to 300 kHz, generate a first polling signal including a wakeup message using the LF sinusoidal carrier wave, and transmit from an antenna of the base station while the vehicle is either in the key on vehicle state or the accessory mode vehicle state the first polling signal for receipt by a portable controller; and
   the base station is further configured to select a LF non-sinusoidal periodic carrier wave in response to the vehicle being in the key off vehicle state, the LF non-sinusoidal periodic carrier wave having a carrier frequency falling within a range of 20 kHz to 300 kHz, generate a second LF polling signal including a wakeup message using the LF non-sinusoidal periodic carrier wave, and periodically transmit from the antenna of the base station while the vehicle is in the key off vehicle state the second polling signal during an absence of a user touching the vehicle until a portable controller responds to the second LF polling signal.

4. The system of claim 3 wherein:
   the non-sinusoidal periodic carrier wave is a square carrier wave.

5. The system of claim 3 wherein:
   the non-sinusoidal periodic carrier wave is a triangle carrier wave.

* * * * *